US011902633B2

(12) United States Patent
Weiner et al.

(10) Patent No.: US 11,902,633 B2
(45) Date of Patent: *Feb. 13, 2024

(54) DYNAMIC OVERLAY VIDEO ADVERTISEMENT INSERTION

(71) Applicant: GumGum, Inc., Santa Monica, CA (US)

(72) Inventors: Ken Weiner, Los Angeles, CA (US); Jagadish Kamath, Karnataka (IN)

(73) Assignee: GumGum, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/805,565

(22) Filed: Jun. 6, 2022

(65) Prior Publication Data

US 2023/0127157 A1    Apr. 27, 2023

Related U.S. Application Data

(63) Continuation of application No. 16/899,305, filed on Jun. 11, 2020, now Pat. No. 11,356,746.

(Continued)

(51) Int. Cl.
*H04N 21/81* (2011.01)
*H04N 21/234* (2011.01)
*H04N 21/431* (2011.01)

(52) U.S. Cl.
CPC ... *H04N 21/8153* (2013.01); *H04N 21/23424* (2013.01); *H04N 21/4316* (2013.01); *H04N 21/812* (2013.01)

(58) Field of Classification Search
CPC .................................................. H04N 21/8153
See application file for complete search history.

(56) References Cited

U.S. PATENT DOCUMENTS 8,863,182 B1    10/2014    Sharifi et al.
9,204,102 B2    12/2015    Ahanger et al.
(Continued)

FOREIGN PATENT DOCUMENTS

WO    WO 2015/159289    10/2015
WO    WO 2020/252204    12/2020

OTHER PUBLICATIONS

International Search Report and Written Opinion—PCT/US2020/037300—dated Sep. 3, 2020.

(Continued)

*Primary Examiner* — Michael H Hong
(74) *Attorney, Agent, or Firm* — Knobbe, Martens, Olson & Bear, LLP

(57) ABSTRACT

Systems and methods are described for server-side manipulation of underlying video content in order to dynamically place overlay content within a video stream in a manner whereby a viewing user sees the advertisement content over or integrated within a portion of the base video content. Segments of the original video file may be modified by a server to display overlay content over a portion of the original content, and a revised manifest file may be generated by the server and sent to a client device. The revised manifest file may cause a video player on the client device to present in sequence (a) a first original portion of the video, (b) a second portion of the video modified to include overlaid advertisement content or other overlay content within the second portion, followed by (c) a third original portion of the video.

20 Claims, 5 Drawing Sheets

Related U.S. Application Data

(60) Provisional application No. 62/861,629, filed on Jun. 14, 2019.

(56) References Cited

U.S. PATENT DOCUMENTS

| | | | |
|---|---|---|---|
| 9,426,543 | B1 | 8/2016 | Li et al. |
| 9,467,750 | B2 | 10/2016 | Banica et al. |
| 9,973,830 | B1 | 5/2018 | Shetty |
| 10,257,253 | B1* | 4/2019 | Freedman ............ G06F 16/9577 |
| 10,638,180 | B1 | 4/2020 | Pringle et al. |
| 11,284,130 | B2 | 3/2022 | Weiner et al. |
| 11,356,746 | B2 | 6/2022 | Weiner et al. |
| 2012/0198492 | A1 | 8/2012 | Dhruv et al. |
| 2016/0014179 | A1* | 1/2016 | Straub ................ H04N 21/8456 709/217 |
| 2016/0173961 | A1 | 6/2016 | Coan et al. |
| 2016/0345074 | A1 | 11/2016 | Serbest et al. |
| 2017/0339114 | A1 | 11/2017 | Watson et al. |
| 2018/0097864 | A1* | 4/2018 | Brinkley ............... H04L 65/612 |
| 2019/0075371 | A1 | 3/2019 | Parampath et al. |
| 2019/0222776 | A1* | 7/2019 | Carter ....................... G06T 7/70 |
| 2020/0204849 | A1 | 6/2020 | Loheide et al. |
| 2020/0396521 | A1 | 12/2020 | Weiner et al. |
| 2021/0168416 | A1 | 6/2021 | Weiner et al. |
| 2023/0034983 | A1 | 2/2023 | Weiner et al. |

OTHER PUBLICATIONS

Grenager, Teg, Video Ad Serving Template (Vast) Version 3.0—Jul. 12, 2012—available at https://www.iab.com/wp-content/uploads/2015/06/VASTv3_0.pdf.

Anonymous Version 4.1: "Video Ad Serving Template (VAST)" IAB Tech Lab, Dec. 31, 2018, pp. 1-113.

* cited by examiner

DYNAMIC OVERLAY VIDEO ADVERTISEMENT INSERTION

CROSS-REFERENCE TO RELATED APPLICATION

This application is a continuation of U.S. patent application Ser. No. 16/899,305 filed on Jun. 11, 2020, which claims the benefit of U.S. Provisional Application No. 62/861,629, filed on Jun. 14, 2019, the entirety of which is hereby incorporated herein by reference.

BACKGROUND

There are a variety of approaches and formats for streaming video content over a network, such as the Internet. For example, two common formats for video streaming are HTTP Live Streaming (HLS) and Dynamic Adaptive Streaming over HTTP (DASH). These and other streaming video approaches often involve storing video content on a server or content delivery network (CDN) in a number of small segments or chunks, such as segments having a playback length between two to ten seconds, depending on the implementation used in a given instance. A manifest file (sometimes referred to as simply a manifest) describes the chunks or segments available for streaming from a given source, including location information such as uniform resource locators (URLs), and may include information regarding various audio and video qualities available (e.g. different resolutions, bitrates, etc.). Different manifest or index data may be associated with different video encoding or bitrates, such that a video player may switch between chunks of different quality depending on bandwidth and/or other considerations during video playback.

Steaming video may be presented with inserted advertisements, such as using Dynamic Ad Insertion (DAI) techniques. Video ads for insertion within a content stream may be delivered to a client device separately from delivery of the base content, with the client-side player handling proper timing and insertion into the video playback, or the video ads may be integrated into the video stream on the server side using server-side ad insertion (SSAI) techniques. SSAI, which may in whole or in part be referred to as ad stitching in some contexts, often involves a combination of manifest manipulation, ad server communication, and ad bitrate and resolution normalization, which all would typically happen on the server side before presenting a manifest to a client device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
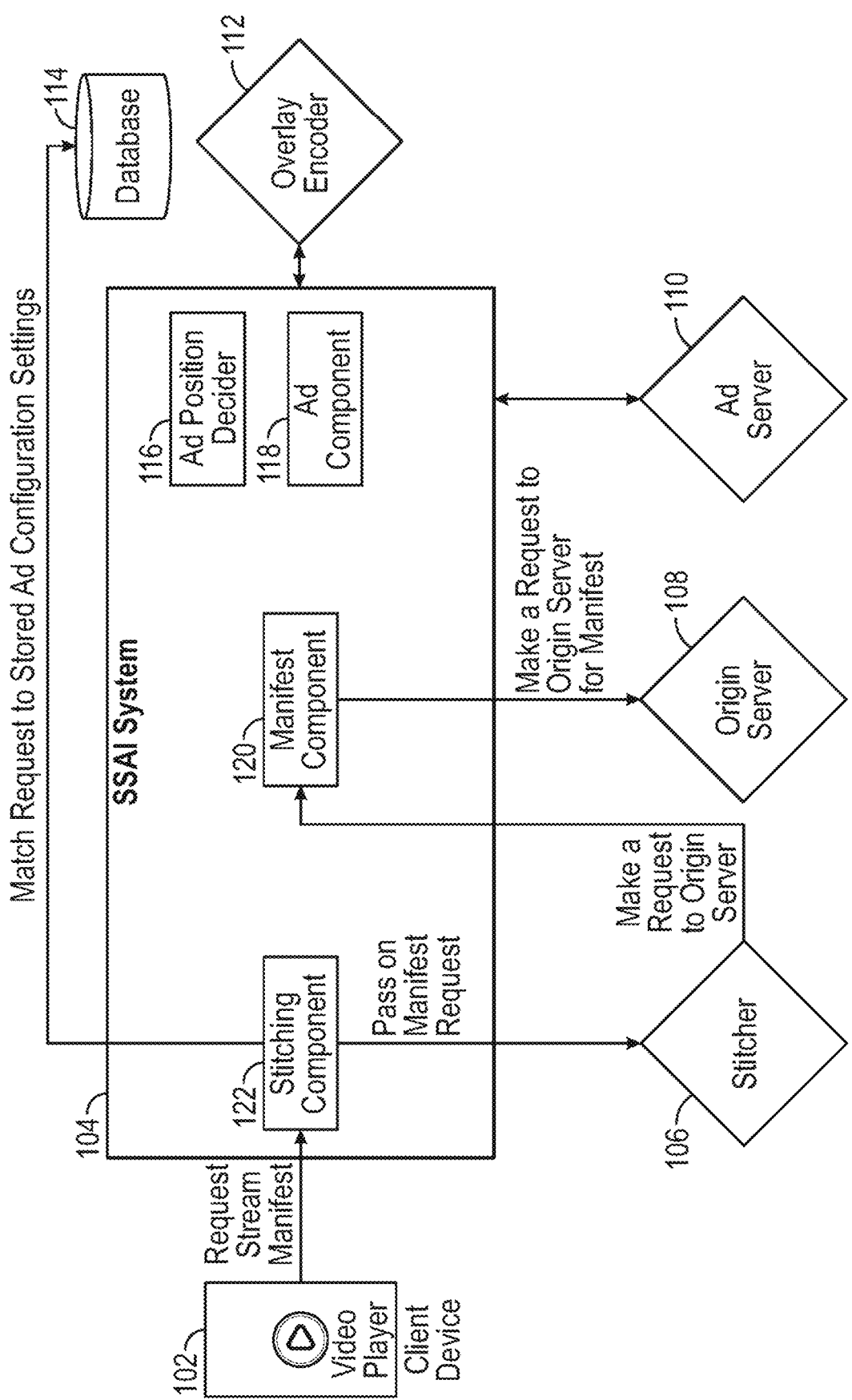
FIGS. 1A and 1B are system diagrams illustrating data flow for implementing aspects of the present disclosure, according to some embodiments.

Existing uses of SSAI include inserting a commercial or other video advertisement within a streaming video (such as a movie, show, or a live stream) on the server side in a manner whereby the resulting stream played on the client device appears similar to a traditional commercial break. For example, in existing SSAI approaches, the base video content, such as a movie or show, is interrupted for a full screen advertisement, then the base content resumes after the advertisement ends, such that the client device is presenting either advertisement content or the base video content at a given moment (but not showing both simultaneously at any time). In contrast to existing SSAI approaches, aspects of the present disclosure relate to server-side manipulation of the underlying video content (such as a show, movie, or a live stream that a user is watching) in order to dynamically place an overlay advertisement or other overlay content within the video stream in a manner whereby a user sees the advertisement content over or integrated within a portion of the base video content (such as within a bottom third of the screen or other subsection of the display) without a pause or commercial break in playback of the base content. From the perspective of the client device that presents the video stream, the stream appears to be a single video stream similar to how the client device would process streaming video that does not include an advertisement.

Advantages of the approaches disclosed herein to the user include that the user may continue to watch the underlying video content of interest while an advertisement is displayed, rather than need to wait for a full-screen commercial or advertisement to play prior to starting or resuming playback of the underlying video of interest to the user. Advantages to content publishers, advertisers and others include that advertisements or other supplemental content added via server-side insertion approaches disclosed herein may be technically challenging for client-side software or browser extensions (such as "ad blockers") to recognize and block from playback. For example, an overlay advertisement that is added over playback of underlying video content on the client side may be blocked in a number of manners by simply not displaying the separate overlay content, whereas techniques described herein in accordance with some embodiments may result in overlay content that is incorporated within the individual video frames on the server side (e.g., modifying or replacing actual pixel data of the base video content prior to delivery of the video content to the client device).

For example, a video publisher, such as a company that wants to offer ad-supported streaming video content to viewing users, may establish a relationship with an SSAI platform described herein in order for the SSAI platform to dynamically insert advertisements within the publisher's video content. The video content may be presented to end-users or viewers via a video player that plays videos on a client device. The player may be provided within a web browser, a mobile application operating on a smartphone or tablet, a connected TV, and/or other over-the-top (OTT) or video playback environment. The video content that a user views via a video player may be supplied to the client device over a network, such as the Internet, as a HLS or DASH manifest URL or file, in some embodiments.

Existing methods of SSAI typically involve presenting linear ads, which may be a video ad that is inserted as a "pre-roll" ad displayed prior to presentation of the video content or a mid-roll ad that is inserted somewhere in the middle of the video content (such that the underlying video pauses, and will not be presented or resumed until the mid-roll ad completes presentation). Aspects of the present disclosure enable SSAI support for an overlay ad, which may be a non-linear ad that appears as an overlay on top of or within the display of the underlying video content. Accordingly, the underlying video content may appear to the user to continue to play as normal with opaque or translucent overlaid content (either static or itself animated or video content) covering a portion of the underlying video. For example, these overlay ads may contain an alpha channel with transparency. According to some embodiments, the presence and timing of overlay ads added in the manner described herein are not discernible by the client device's video player or any associated ad blocking software. While advertisements (ads) are often used as an example herein, it will be appreciated that any supplemental image, text or video content could be integrated within frames of original video segments according to methods described herein. For example, the overlay content or other supplemental content could be informational as opposed to promotional.

Figure 1B:
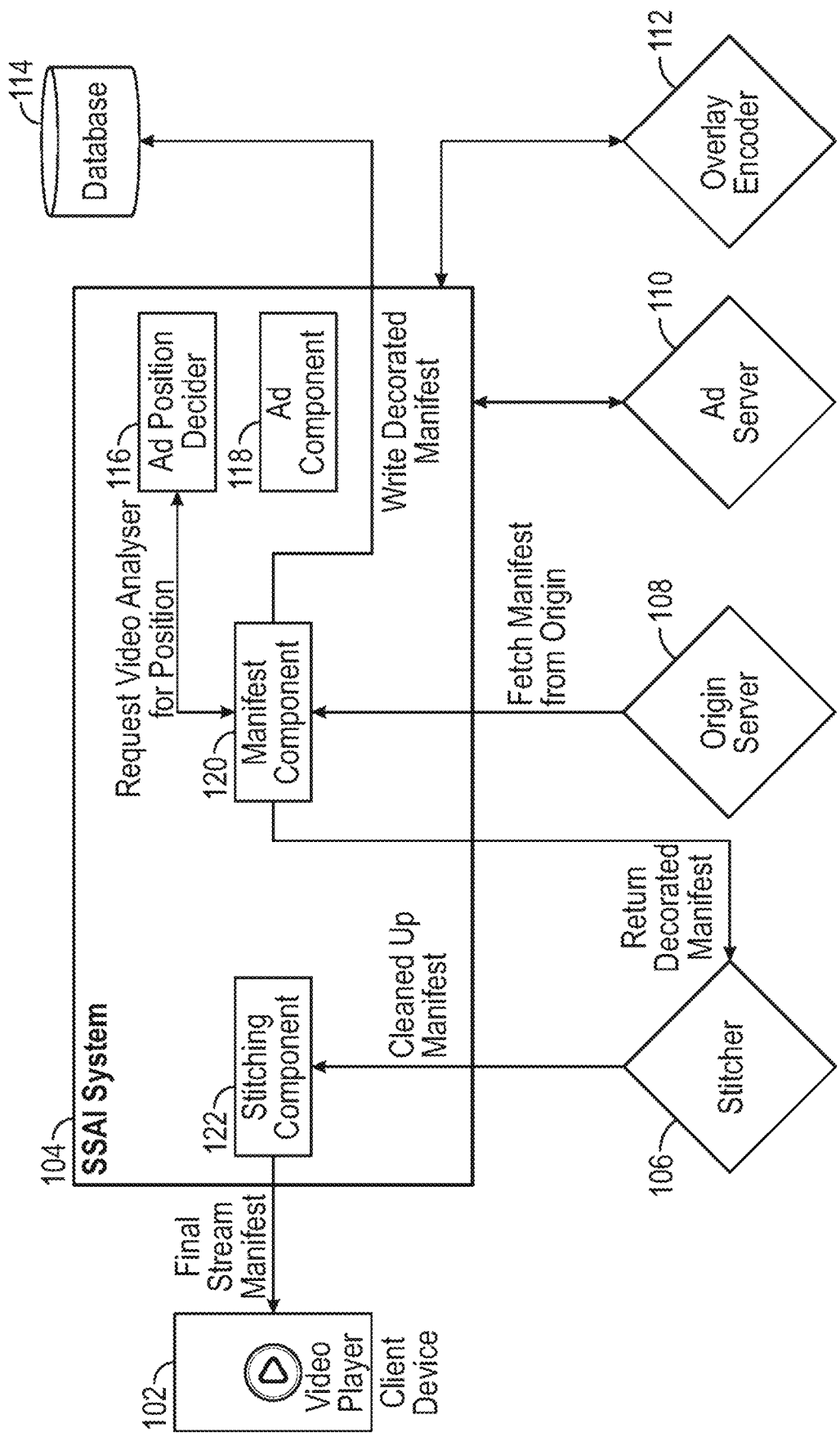

FIGS. 1A and 1B are system diagrams illustrating data flow for implementing aspects of the present disclosure, according to some embodiments. As illustrated in FIG. 1A, a client device 102 (such as a desktop computer, laptop computer, smartphone, tablet device, or other computing device) of a user who wants to view streaming video content on a video player operating on the client device 102 may send a stream manifest request to the SSAI platform or system 104. The request may be over a network, such as the Internet. It will be appreciated that the video player may be implemented within a web browser, may be a stand-alone video player application (such as operating on a mobile phone, tablet computer or other personal computer), may be a proprietary application of a particular third-party publisher or video platform, may be implemented within a television, and/or other application. The SSAI system 104 may be an Internet-accessible server, service, system or platform that provides advertisement integration within videos across a wide variety of video publishers. For example, the client device 102 may be presenting a webpage of a first publisher to the user of the device that includes an embedded video player that is requesting to load streaming content identified by the given stream manifest referenced in code associated with the page.

Figure 3:
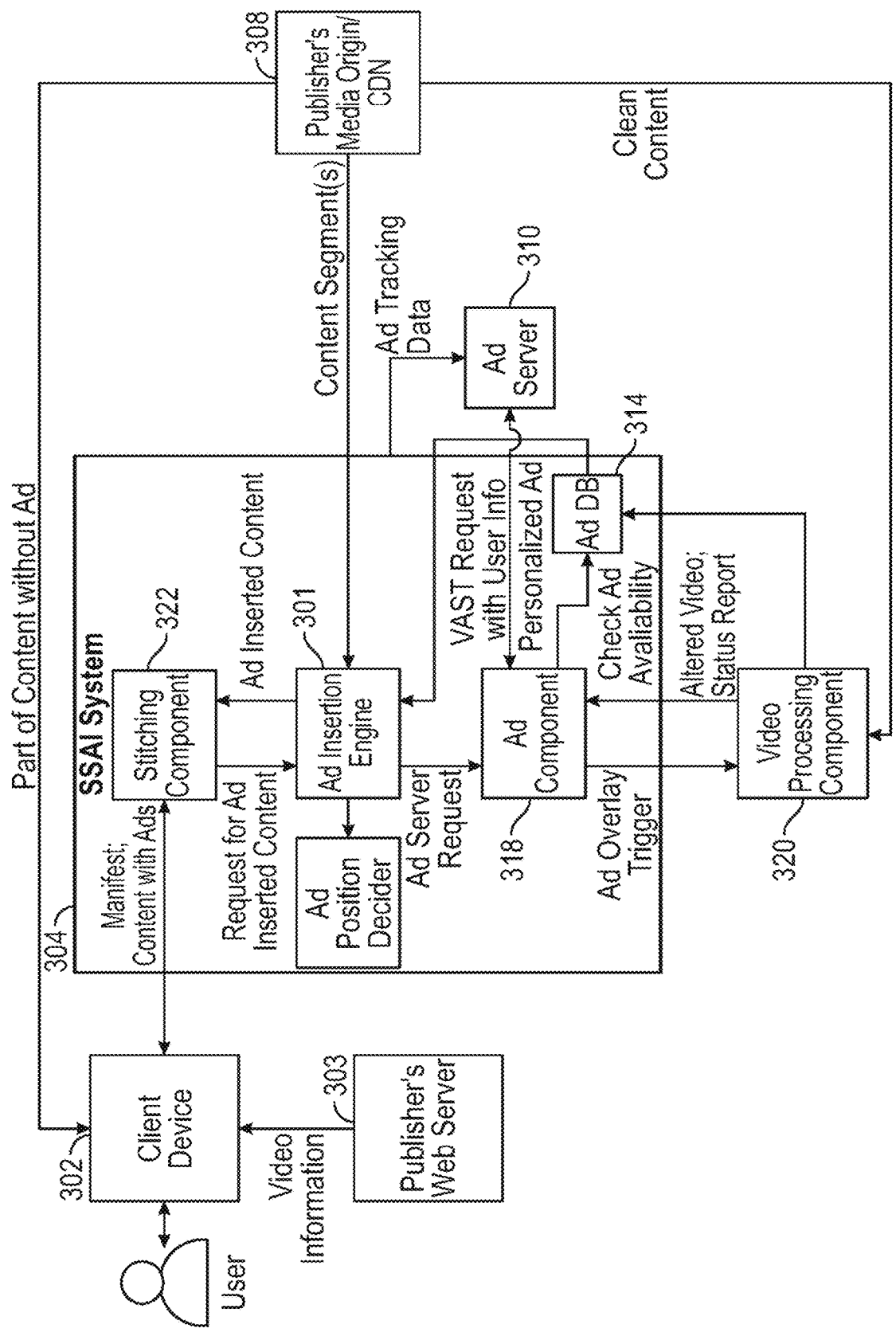
FIG. 3 illustrates example data flow, according to one embodiment, for delivering video content and associated overlay advertisement content for playback on a client device.

The stitching module or component 122 (which may be considered a stitching layer, in some embodiments) of the platform 104 may match the request with a configuration file in database 114, and may also pass on the manifest request to a stitcher service or component 106 (which may be internal or external to the platform 104). While the stitcher is illustrated as external to the SSAI system 104 in FIG. 1A, in some embodiments, the stitcher may be a component within the SSAI system 104. For example, functionality of the stitcher 106 and manifest component 120 may be provided by an advertisement insertion engine that is internal to the SSAI system (as shown in FIG. 3, discussed below).

The configuration file may initialize the instance of the platform based on various parameters configured in the configuration file, which may be specific to a given manifest request and/or publisher. For example, the configuration file (or config file) may include a set of rules created to govern advertisement insertion for a certain set of videos owned by a given content owner, such as a particular publisher or host of a page or service that the client device has accessed. The parameters in a configuration file may be one-time parameters (OTP), such as in a JSON format. The parameters may include information regarding databases or other data sources containing various files that will be used in generating the combined video content, media stitcher configuration information, information associated with an overlay encoder 112, HTTP server parameters, database credentials, logging parameters, origin server URL, ad decision server (ADS) information, advertisement type information (e.g., overlay, insertion, replacement, or other), ad position (e.g., random, periodic, analysis-based, or other), and/or other configuration data. The configuration file or data record may be identified by a configuration key included in a URL or URI received from the client device. This URL may be, for example, a URL associated with the SSAI platform that mirrors the path or URL for the underlying video asset (which may be hosted by the publisher or an associated CDN), but is hosted by the SSAI platform and includes the configuration key.

The stitcher service, after receiving the manifest request, may retrieve the requested manifest from an associated origin server 108 or other video source, such as via a manifest layer or component 120 of the platform 104. In some instances, the origin 108 may be a content delivery network (CDN) used by the given video publisher. The retrieved or fetched original video content may then be returned to the video player on the client device (not pictured in FIG. 1A), while the SSAI system analyzes the content for determining locations to insert or overlay advertisements or other supplemental content, as will be further discussed below.

Continuing to FIG. 1B, which illustrates further data flow following that described above with respect to FIG. 1A, the original manifest retrieved from the origin server 108 may be processed by the manifest component 120 for decoration or modification. The manifest component 120 may query the ad position decider 116 for an ad position, which may be a timestamp in the video at which an advertisement should be inserted as overlay content or other content integrated within frames of the video. The ad position decider may analyze the video and provide ad positions (such as timestamps or other position information) for the video. The ad positions may be determined based on metadata without analyzing the actual video data itself, or may be include analysis of the video file itself (such as image analysis of individual frames), depending on the embodiment. For example, the ad positions may be based on stored rules (such as time between ads), original manifest information, video content analysis (such as object detection within video frames), analysis of sound in the videos (e.g., to detect a pause in action), and/or other manners. The manifest is then decorated with the ad position information. The decorated manifest is stored in database 114 for future use and also returned to the stitcher 106. The ad positions may be encoded as, for example, to include an event_id and unique_program_id.

The stitching service 106 may then identify when to insert an ad in the video based on the decorations present in the revised manifest. The stitcher may perform a stitching job, as will be further described below, and then return a clean manifest to the stitching component 122, which may in turn return the clean manifest to the client device 102 for playback of the video content by the video player. As will be further described below, the stitching component 106 may further rely on an overlay encoder 112 and ad server 110 (which may be referenced as an ADS, or ad decision server, in some embodiments).

Figure 2:
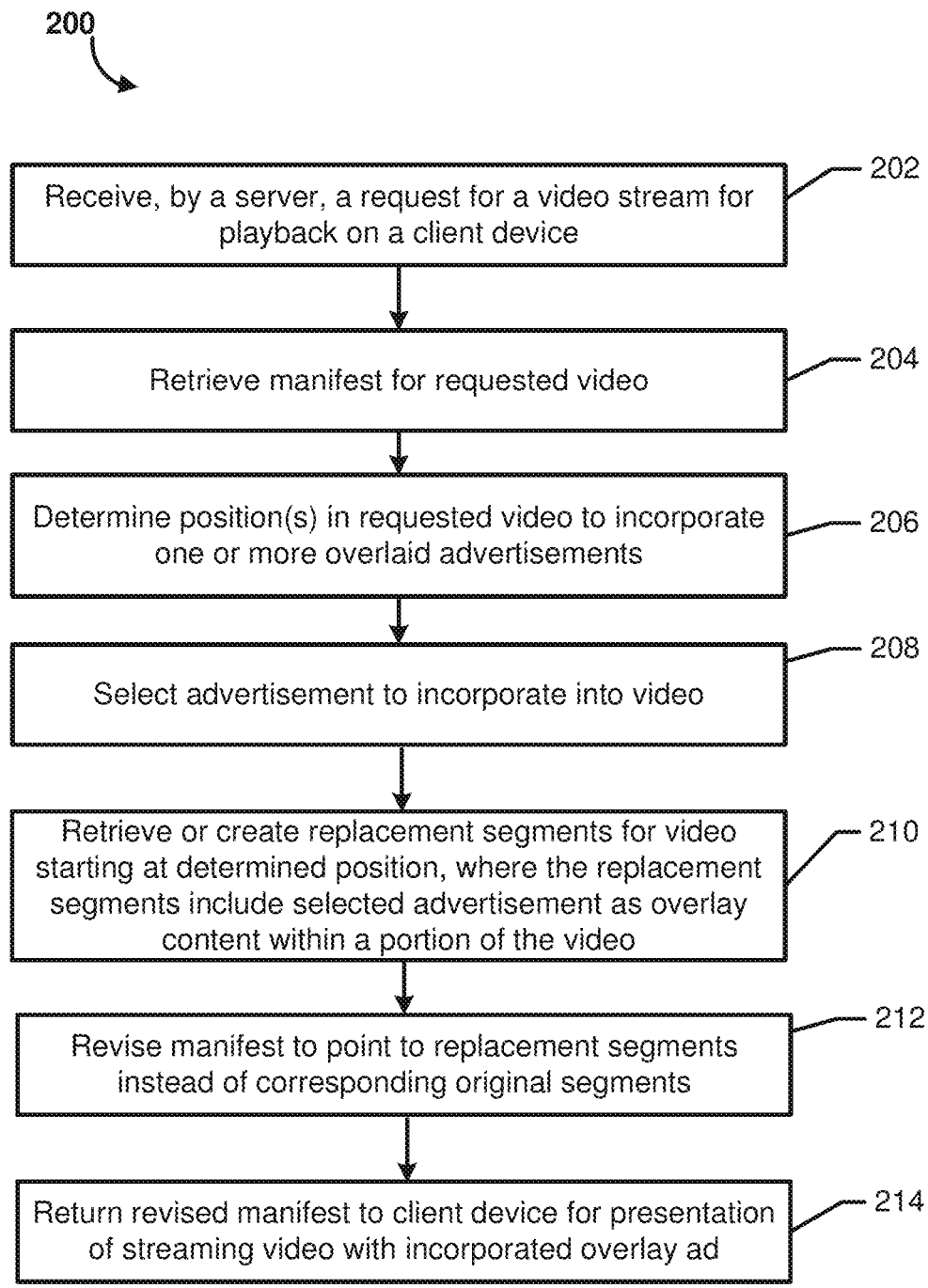
FIG. 2 is a flow diagram of an illustrative method for providing streaming video with overlaid advertisement content to a client device.

FIG. 2 is a flow diagram of an illustrative method 200 for providing streaming video with overlaid advertisement content to a client device. The illustrative method 200 may be implemented by a server or platform, such as SSAI system 104 described above or computing system 302 described below, or by a number of computing systems performing different blocks. For ease of description, the blocks will be described below as being performed by the SSAI platform 104 (which may also be referenced below as a computing system).

The illustrative method 200 begins at block 202, where the platform receives, from a client device over a network, a request for a video for streaming playback on the client device. At block 204, the platform may then retrieve a manifest file corresponding to the requested video from local or remote storage. In some embodiments, the manifest may have been previously stored by the platform, while in other embodiments the manifest may be retrieved from storage associated with a partner publisher service.

At block 206, the platform may determine one or more positions in the video at which to incorporate an advertisement, such as an overlay or non-linear advertisement. In some embodiments, the positions may be determined from previously stored tags or other information, or may be dynamically determined based on analysis of the video and/or associated metadata, as described above. The platform may then, at block 208, select advertisement content based on the video, the manifest file, client device information, the viewing user, the publisher, ad keywords associated with the video or page on which the video appears, and/or other factors known in the field of online advertising. In some embodiments, the advertisement may be selected by a third-party advertisement service, network or platform based on information passed to the third-party advertisement service by the SSAI platform (such as information regarding the client device, the video, a user of the client device, and/or other information known in the field of online advertising).

At block 208, the platform may retrieve or create replacement segments or chunks for the original video starting at the determined ad insertion position (such as video chunks or segments for a 30 second portion of the original video in which a 30 second ad is to be overlaid). For example, the platform may first check whether the selected ad has previously been placed by the platform at the selected position in the given underlying video content (e.g., whether this given 30 second ad has previously been overlaid within the same 30 second portion of the original video content for delivery to a prior user), such that replacement segments that include the relevant portions of underlying video with the selected ad overlaid within the video may already be generated and stored in a database, CDN or other repository.

If the given original video segments have not been previously modified for the selected ad, the platform may retrieve the relevant original video portion(s) from the video in which to insert overlay content. The relevant portion(s) of the original video may be retrieved as a set of consecutive chunks or segments (e.g., based on URL(s) or other segment information in the manifest) or by extracting the relevant portion of video from a longer master file for the original video content, such as a mezzanine file.

If instead the combination of selected overlay content and underlying original video have not been previously generated and stored, the platform may generate the replacement segments of the video, where the replacement segments depict a section or portion (e.g., a one minute section of the original video) with the selected advertisement content overlaid over the original video content or otherwise integrated into the portion (such as in an augmented reality view where the content appears to be within a real world environment depicted in the underlying video). The overlay pixel data may be incorporated within the pixel data of each frame of the relevant frames of the underlying video such that that a plurality of individual video frames within the replacement segments each depict both advertisement content and original content of the video within the same frame. For example, an advertiser's logo and/or associated video advertisement content may appear in a bottom corner of the underlying video, as a banner or ticker along the bottom of the video, appearing to interact with an object in the underlying video, and/or in another manner.

The replacement content may be generated using an overlay encoder of the platform that receives a video fragment or section (which may be a collection of segments or chunks) of the underlying original video as one input, and receives an advertisement image or video as a second input, and outputs a replacement fragment or section of the original video that incorporates the advertisement content. The overlay encoder may also receive other inputs, such as an indication of where (e.g., in-frame positioning) in the video the advertisement should be displayed (e.g., top_left, top_centre, top_right, bottom_right, etc.), the size that the advertisement should appear, translucency levels, etc. In some embodiments, the encoder may output and store the modified video in one or more known mezzanine formats. The audio from the original video may be retained without modification in the replacement video, in some embodiments.

At block 212, the platform may generate a revised manifest file that includes references to the replacement segments instead of corresponding original segments of the video. For example, the revised manifest may reference chunks or segments of the generated overlay segments from block 210 (such as by referencing a URL or other location of the segments) in place of prior references to corresponding segments or chunks of the original video. At block 214, the platform may then send, such as over the Internet or other network, the revised manifest file to the client device for presentation of streaming video that will include the overlay ad content. For example, processing of the revised manifest by a video player on the client device may cause the client device to present in sequence (a) a first original portion of the video, (b) a second portion of the video that was modified by the platform to include overlaid advertisement content within the second portion, and (c) a third original portion of the video. It will be appreciated that the SSAI platform may include multiple advertisements or other supplemental content (whether as overlay content or otherwise) during playback of a given video stream to a particular user. For example, the "second portion of the video" mentioned above could include multiple advertisements presented within different sets of frames of the second portion of the video, prior to presenting the third original portion of the video. As another example, the SSAI platform may integrate a second advertisement in a fourth portion of video that follows the "third original portion" referenced above.

FIG. 3 illustrates example data flow, according to one embodiment, for delivering video content and associated overlay advertisement content for playback on a client device. The majority of steps illustrated in FIG. 3 have previously been described above. Some additional details are provided in FIG. 3 with respect to the stitching operations, advertisement tracking, and other components or steps. The illustrated embodiment begins with a client device 302 receiving video information (such as a URL of a video) from a publisher's server 303. For example, the user of the client device may be accessing a website hosted by the publisher's server that includes a video embedded or referenced in the page. The publisher may have arranged for the video request to point to the SSAI system (such as via a mirrored path, as described above) for retrieval of a manifest file that will enable the client device to retrieve and play video content.

Once the SSAI system 304 receives a manifest request from a client device 302, the stitching component 322 may send a request for ad-inserted content from an ad insertion engine 301 (which may, in the embodiment illustrated in FIG. 3, implement functionality provided by other elements described above with respect to embodiments in FIGS. 1A and 1B, such as functionality provided by the manifest component and stitcher). The SSAI system 304 may then communicate with an ad server 310 (such as a server associated with a third-party advertisement service) or an internal advertisement source to request an advertisement. For example, as illustrated, the ad component 318 may receive the ad server request from the ad insertion engine 301 (as well as other information, such as the original manifest) and retrieve a video ad serving template (VAST) from the ad server 310, ADS or other ad source. The request may additionally include information about the client device 302 and/or the user of the client device 302 for advertisement selection or targeting purposes.

The VAST may be a file or script that provides various advertisement-related information, such as information regarding which ad to play, how the ad should appear, how long the ad should last, whether users are able to skip the ad, and/or other information or player instructions. For each unique combination of original content portion and advertisement selected, a request is sent to the video processing component 320 to generate replacement video segments that include the advertisement content integrated within the original video segments over a series of video frames. The ad database 314 may maintain records of all replacement video segments generated by the video processing component (e.g., indexed by advertisement identifier and underlying video timestamps) such that the ad component can retrieve previously cached replacement segments without requiring the video processing component to generate new video segments in some instances. This information regarding generated and stored replacement video segments may be updated via status reports sent from the video processing component 320 to the ad component 318 and/or ad database 314.

An overlay encoder or video processing component 320 may generate the revised portion(s) of original video content with the overlay ad therein (as described above), which is stored in mezzanine file storage, internal database 314 or another repository, and also provided back to the ad component 318. The video processing component may retrieve the underlying video segments from the publisher's media origin server or CDN 308 (such as based on the original manifest) and then integrate the advertisement content therein using stitching methods. It will be appreciated that the advertisement may be selected based on the user or the content of the advertisement could be generated to be personalized to the particular user, but neither is required. In some embodiments, there may be several video processor worker instances to handle concurrent overlay load. For example, the overlay content generation may take some time (e.g., seconds or minutes, in some embodiments depending on various factors). Accordingly, the video processor may continue to update the ad component regarding a current percentage completion of each job, then may send a "complete" signal or indicator when 100% of the processing is completed and the replacement video content is ready for providing to a client device. Accordingly, the ad-inserted content may then be returned to the stitching component 322 for delivery to the client device 302 for playback when indicated in the revised manifest provided to the client device.

As described above, when the client device 302 processes a revised manifest, the client device may be directed to alternatively at any given point in the playback (based on the manifest) either stream original content fragments from a content origin server 308 (e.g., original video content portions not including advertisement display) or overlay ad segments (e.g., segments including original content with an ad overlay) from the SSAI system or related server in a seamless manner. In some embodiments, the source of the ad-inserted content and the original video content may be the same physical source, but have different URLs.

During the time that the user watches an ad-inserted video segment or soon after, the SSAI system 304 may report advertisement tracking information to the ad server 310. While traditional advertisement tracking relies on information sent from an advertisement service directly to a client device, such as tracking pixels, the SSAI system 304, in some embodiments, may not pass any tracking pixels from the ad server 310 to the client device 302. From the perspective of the client device, segments of the video content that include advertisement content within a portion of each video frame over a given time period in the video may be indistinguishable from a technical perspective from the non-overlaid part of the content. For example, the difference may be seen through human viewing of the video or through substantive image analysis of the video frames, but not identifiable in an automated manner from the manifest, URLs or any code provided to the client device (e.g., as may be typically performed by ad-blocking software). However, because the SSAI system maintains records of which segments of the content include advertisements (which were placed therein by the SSAI system) and the time at which the client device 302 receives those segments for playback, the SSAI system may be configured to automatically send appropriate tracking data back to the ad server 310 identifying that a particular advertisement was served to a client (e.g., the SSAI system may fire a tracking pixel associated with the ad to the ad server 310).

Figure 4:
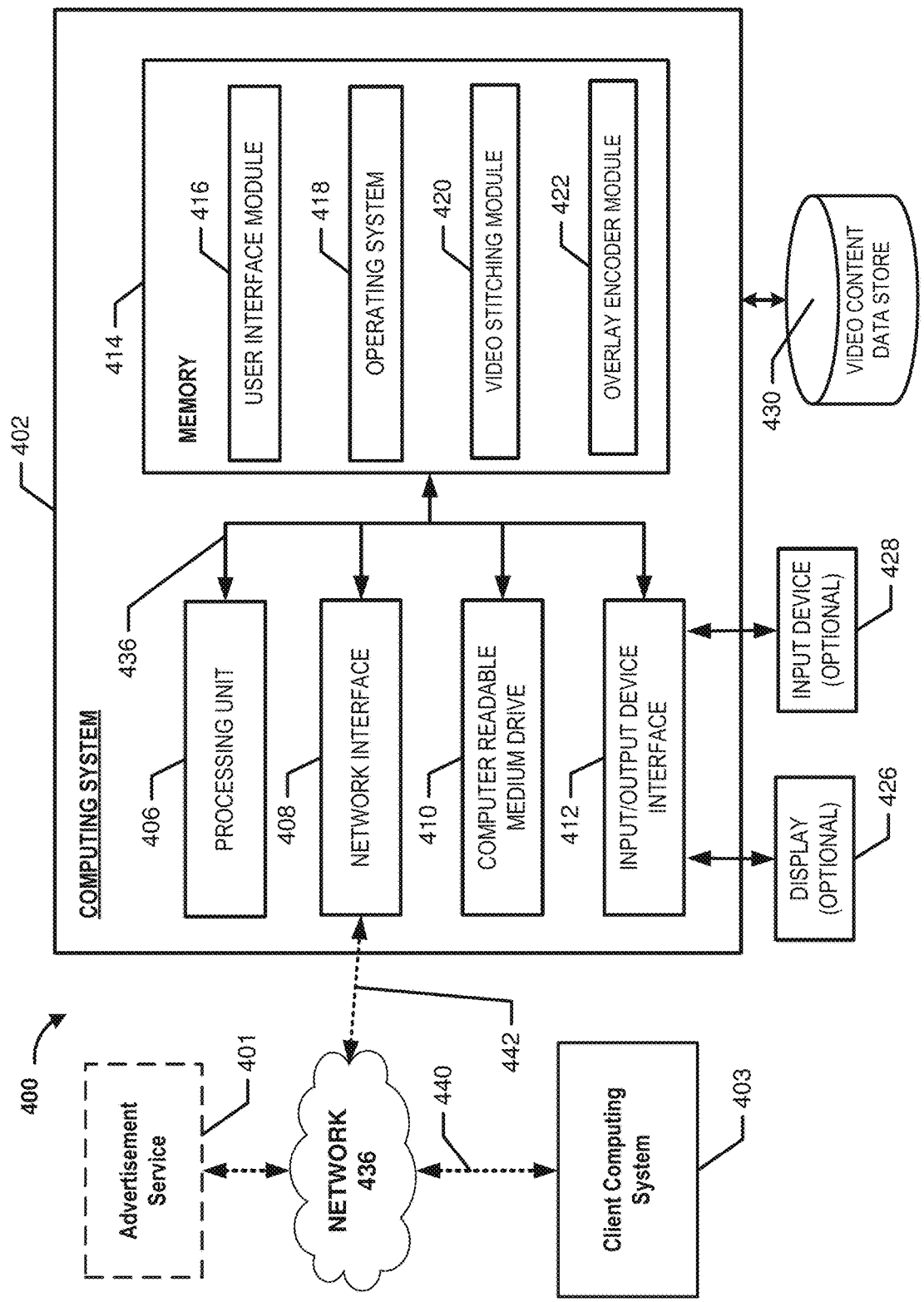
FIG. 4 is a system block diagram of a computing environment suitable for use in various embodiments of the present disclosure.

FIG. 4 illustrates a general architecture of a computing environment 400, according to some embodiments. As depicted in FIG. 4, the computing environment 400 may include a computing system 402. The general architecture of the computing system 402 may include an arrangement of computer hardware and software components used to implement aspects of the present disclosure. The computing system 402 may include many more (or fewer) elements than those shown in FIG. 4. It is not necessary, however, that all of these generally conventional elements be shown in order to provide an enabling disclosure. In some embodiments, the computing system 402 may be one instance of what is referred to above as a computing system or the SSAI platform or system (such as the SSAI system 104 or the SSAI system 304).

As illustrated, the computing system 402 includes a processing unit 406, a network interface 408, a computer readable medium drive 410, an input/output device interface 412, an optional display 426, and an optional input device 428, all of which may communicate with one another by way of a communication bus 436. The processing unit 406 may communicate to and from memory 414 and may provide output information for the optional display 426 via the input/output device interface 412. The input/output device interface 412 may also accept input from the optional input device 428, such as a keyboard, mouse, digital pen, microphone, touch screen, gesture recognition system, voice recognition system, or other input device known in the art.

The memory 414 may contain computer program instructions (grouped as modules or components in some embodiments) that the processing unit 406 may execute in order to implement one or more embodiments described herein. The memory 414 may generally include RAM, ROM and/or other persistent, auxiliary or non-transitory computer-readable media. The memory 414 may store an operating system 418 that provides computer program instructions for use by the processing unit 406 in the general administration and operation of the computing system 402. The memory 414 may further include computer program instructions and other information for implementing aspects of the present disclosure. For example, in one embodiment, the memory 414 may include a user interface module 416 that generates user interfaces (and/or instructions therefor) for display upon a computing system, e.g., via a navigation interface such as a browser or application installed on the computing system 402 or the client computing system 403.

In some embodiments, the memory 414 may include a video stitching module 420 and overlay encoder module 422, which may be executed by the processing unit 406 to perform operations according to various embodiments described herein. The modules 420 and/or 422 may access the data store 430 in order to retrieve data described above and/or store data, such as video segments with ad content integrated with original underlying video content. The data store may be part of the computing system 402, remote from the computing system 402, and/or may be a network-based service.

In some embodiments, the network interface 408 may provide connectivity to one or more networks or computing systems, and the processing unit 406 may receive information and instructions from other computing systems or services via one or more networks. In the example illustrated in FIG. 4, the network interface 408 may be in communication with a client computing system 403 via the network 436, such as the Internet. In particular, the computing system 402 may establish a communication link 442 with a network 436 (e.g., using known protocols) in order to send communications to the computing system 403 over the network 436. Similarly, the computing system 403 may send communications to the computing system 402 over the network 436 via a wired or wireless communication link 440. In some embodiments, the computing system 402 may additionally communicate via the network 436 with an optional third-party advertisement service 401, which may be used by the computing system 402 to retrieve advertisement content. Depending on the embodiment, the computing system 402 may be configured to retrieve advertisement data from either data store 430 or third-party advertisement service 401 depending on various information, such as the publisher, advertiser preferences, comparison of ad bid information, and/or other factors.

Those skilled in the art will recognize that the computing systems 402 and 303 may be any of a number of computing systems including, but not limited to, a laptop, a personal computer, a personal digital assistant (PDA), a hybrid PDA/ mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like. The client computing system 403 may include similar hardware to that illustrated as being included in computing system 402, such as a display, processing unit, network interface, memory, operating system, etc. In some embodiments, the client computing system 403 may perform various steps described herein based in part on a browser or other application operating on the client computing system 403 executing code received over the network from the computing system 402, a publisher server, and/or other network-accessible server or service.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   one or more processors in communication with the memory and configured to:
     receive, from a client device of a first user over a network, a request for a video for streaming playback on the client device;
     retrieve a manifest file for the video;
     determine a first position in the video to incorporate an advertisement;
     select advertisement content, from among a plurality of potential advertisements, based on at least one of the video, the manifest file or the client device;
     determine that an electronic data store that stores a plurality of replacement segments associated with the video does not include a previously generated replacement segment associated with a combination of the first position in the video and the advertisement content;
     retrieve one or more original video segments from the video in which to incorporate the advertisement, wherein the one or more video segments are retrieved based on the first position in the video;
     generate one or more replacement segments of the video, wherein the one or more replacement segments depict at least portions of the advertisement content integrated within video content from the one or more original video segments;
     store the generated one or more replacement segments of the video in the electronic data store for providing to additional users in association with subsequent requests for the video;
     generate a revised manifest file that includes references to the one or more replacement segments instead of one or more corresponding original segments of the video; and
     send, over the network, the revised manifest file to the client device for presentation of streaming video by the client device in accordance with the revised manifest file.

2. The computer system of claim 1, wherein the one or more processors are further configured to:
   subsequent to sending the revised manifest file to the client device, receive, from a second client device of a second user that is different than the first user, a second request for the video for streaming playback on the second client device;

select, from among the plurality of potential advertisements, to present the advertisement content at the first position in the video on the second client device;

determine that the electronic data store already includes the previously generated one or more replacement segments associated with the combination of the first position in the video and the advertisement content; and send, to the second client device, a second revised manifest file that includes references to the one or more replacement segments instead of the corresponding original segments of the video, wherein the second revised manifest file references the one or more replacement segments that were previously stored in the electronic data store without generating new replacement segments in response to the second request.

3. The computer system of claim 1, wherein the advertisement content is selected based at least in part on information regarding at least one of the client device or the first user of the client device.

4. The computer system of claim 1, wherein generating the one or more replacement segments of the video comprises, for each of a plurality of individual frames within the one or more original video segments, replacing some but not all pixels in the individual frame with pixels of the advertisement content.

5. The computer system of claim 1, wherein the revised manifest file is sent to the client device as one of (a) a HTTP Live Streaming (HLS) manifest or (b) a Dynamic Adaptive Streaming over HTTP (DASH) manifest.

6. The computer system of claim 1, wherein the second portion of the video modified to include advertisement content is displayed on the client device as a translucent overlay such that original video content is at least partly visible beneath overlaid advertisement content.

7. The computer system of claim 1, wherein the one or more processors are further configured to extract the one or more original video segments in which to incorporate the advertisement from a file associated with the video requested for streaming playback on the client device, wherein the file is a master file or mezzanine file including additional video other than the one or more original video segments in which to incorporate the advertisement.

8. The computer system of claim 1, wherein the one or more processors are further configured to:

determine a second position in the video to incorporate a second advertisement, wherein the second position in the video is subsequent to the first position;

select second advertisement content to present at the second position; and generate second replacement segments of the video, wherein the second replacement segments depict the second advertisement content integrated within video content of original video segments identified based on the second position, wherein the revised manifest file includes references to the second replacement segments.

9. The computer system of claim 2, wherein the one or more processors are further configured to:

receive, from a third client device over the network, a third request for the video for streaming playback on the third client device;

select second advertisement content based at least in part on information regarding at least one of the third client device or a user of the third client device, wherein the second advertisement content is different than the advertisement content;

generate a second set of replacement segments of the video, wherein the second set of replacement segments depict at least portions of the second advertisement content integrated within video content from the one or more original video segments;

generate a third revised manifest file that includes references to the second set of replacement segments instead of corresponding original segments of the video; and send the third revised manifest file to the third client device over the network.

10. The computer system of claim 6, wherein the advertisement content contains an alpha channel with transparency.

11. A computer-implemented method comprising:

receiving, from a client device of a first user over a network, a request for a video for streaming playback on the client device;

retrieving a manifest file for the video;

determining a first position in the video to incorporate an advertisement;

selecting advertisement content, from among a plurality of potential advertisements, based on at least one of the video, the manifest file or the client device;

determining that an electronic data store that stores a plurality of replacement segments associated with the video does not include a previously generated replacement segment associated with a combination of the first position in the video and the advertisement content;

retrieving one or more original video segments from the video in which to incorporate the advertisement, wherein the one or more video segments are retrieved based on the first position in the video;

generating one or more replacement segments of the video, wherein the one or more replacement segments depict at least portions of the advertisement content integrated within video content from the one or more original video segments;

storing the generated one or more replacement segments of the video in the electronic data store for providing to additional users in association with subsequent requests for the video;

generating a revised manifest file that includes references to the one or more replacement segments instead of corresponding original segments of the video; and sending, over the network, the revised manifest file to the client device for presentation of streaming video by the client device in accordance with the revised manifest file.

12. The computer-implemented method of claim 11 further comprising:

subsequent to sending the revised manifest file to the client device, receiving, from a second client device of a second user that is different than the first user, a second request for the video for streaming playback on the second client device;

selecting, from among the plurality of potential advertisements, to present the advertisement content at the first position in the video on the second client device;

determining that the electronic data store already includes the previously generated one or more replacement segments associated with the combination of the first position in the video and the advertisement content; and sending, to the second client device, a second revised manifest file that includes references to the one or more replacement segments instead of the corresponding original segments of the video, wherein the second revised manifest file references the one or more replacement segments that were previously stored in the electronic data store without generating new replacement segments in response to the second request.

13. The computer-implemented method of claim 11, wherein sending the revised manifest file to the client device causes a video player operating on the client device to present in sequence: (a) a first original portion of the video, then (b) a second portion of the video modified to include advertisement content within the second portion, and then (c) a third original portion of the video.

14. The computer-implemented method of claim 11, wherein generating the one or more replacement segments of the video comprises including unmodified original audio from the one or more original video segments in the one or more replacement segments.

15. The computer-implemented method of claim 11 further comprising:
 requesting the advertisement content from a third party advertisement service; and
 reporting to the third party advertisement service when the one or more replacement segments that include the advertisement content are sent to the client device for playback.

16. The computer-implemented method of claim 11, wherein the advertisement content is selected based at least in part on information regarding the first user of the client device.

17. The computer-implemented method of claim 12 further comprising:
 receiving, from a third client device over the network, a third request for the video for streaming playback on the third client device;
 selecting second advertisement content based at least in part on information regarding at least one of the third client device or a user of the third client device, wherein the second advertisement content is different than the advertisement content;
 generating a second set of replacement segments of the video, wherein the second set of replacement segments depict at least portions of the second advertisement content integrated within video content from the one or more original video segments;
 generating a third revised manifest file that includes references to the second set of replacement segments instead of corresponding original segments of the video; and
 sending the third revised manifest file to the third client device over the network.

18. The computer-implemented method of claim 15, wherein the reporting to the third party advertisement service comprises sending tracking pixel data from a server to the third party advertisement service, wherein the tracking pixel data is not provided to the client device.

19. Non-transitory computer readable media including computer-executable instructions that, when executed by a computing system, cause the computing system to perform operations comprising:
 receiving, from a client device of a first user over a network, a request for a video for streaming playback on the client device;
 retrieving a manifest file for the video;
 determining a first position in the video to incorporate an advertisement;
 selecting advertisement content, from among a plurality of potential advertisements, based on at least one of the video, the manifest file or the client device;
 determining that an electronic data store that stores a plurality of replacement segments associated with the video does not include a previously generated replacement segment associated with a combination of the first position in the video and the advertisement content;
 retrieving one or more original video segments from the video in which to incorporate the advertisement, wherein the one or more video segments are retrieved based on the first position in the video;
 generating one or more replacement segments of the video, wherein the one or more replacement segments depict at least portions of the advertisement content integrated within video content from the one or more original video segments;
 storing the generated one or more replacement segments of the video in the electronic data store for providing to additional users in association with subsequent requests for the video;
 generating a revised manifest file that includes references to the one or more replacement segments instead of corresponding original segments of the video; and
 sending, over the network, the revised manifest file to the client device for presentation of streaming video by the client device in accordance with the revised manifest file.

20. The non-transitory computer readable media of claim 19, wherein the one or more replacement segments of the video are generated such that the one or more replacement segments depict at least portions of the advertisement content overlaid over video content from the one or more original video segments, such that a plurality of individual video frames within the one or more replacement segments each depict both advertisement content and portions of corresponding original frames of the video.

* * * * *